United States Patent

Yano et al.

[15] 3,666,883

[45] May 30, 1972

[54] SPEED DETECTION AND CONTROL

[72] Inventors: Osahiko Yano, Kadoma; Takahiro Nakamura, Neyagawa; Masahiro Deguchi, Yao, all of Japan

[73] Assignee: Matsushita Electric Industrial Co., Ltd., Osaka, Japan

[22] Filed: Apr. 30, 1970

[21] Appl. No.: 33,265

[30] Foreign Application Priority Data

May 8, 1969 Japan...............................44/36860
May 30, 1969 Japan...............................44/43793
June 10, 1969 Japan...............................44/46665

[52] U.S. Cl. ............... 178/6.6 P, 179/100.2 S, 340/174.1 A, 340/174.1 B
[51] Int. Cl. .................. G11b 5/26, G11b 15/52, H04n 5/78
[58] Field of Search ............... 178/6.6 P, 6.6 A; 179/100.2 T, 179/100.2 S; 340/174.1 A, 174.1 B

[56] References Cited

UNITED STATES PATENTS

| | | |
|---|---|---|
| 3,402,350 | 9/1968 | Shellabarger.....................179/100.2 S |
| 3,549,797 | 12/1970 | Dann...................................178/6.6 P |
| 3,213,193 | 10/1965 | Konishi...............................178/6.6 P |

Primary Examiner—Howard W. Britton
Attorney—Stevens, Davis, Miller & Mosher

[57] ABSTRACT

A method of speed detection comprising the steps of recording pulse signals in a travelling tape or rotating body of magnetic material with an equal distance and reproducing the recorded pulse signals to detect the speed of the tape or the body. Speed control utilizing the above detection means comprises the step of comparing the phases of said reproduced pulse signals and a reference signal of a predetermined frequency to control the tape or body to move at a predetermined speed.

8 Claims, 8 Drawing Figures

Patented May 30, 1972

O. YANO,
T. NAKAMURA &
M. DEGUCHI
INVENTORS

BY Stevens, Davis, Miller & Mosher
ATTORNEY

SPEED DETECTION AND CONTROL

This invention relates to a method of speed detection in which the running speed of a tape or the rotation speed of a rotating body is derived as a signal of such a frequency which can represent the speed and to a method for controlling said tape or rotating body to a predetermined speed utilizing the above speed detection at the portion of a servo-circuit.

Among conventional techniques, there is a speed detection system comprising the steps of recording a reference timing signal of a certain frequency additionally in the peripheral portion of a tape simultaneously with the record of information and reproducing such recorded signal with the reproduction of recorded information to detect the tape speed, and a speed control comprising the step of comparing the reproduced timing signal and the reference signal in the reproduction step to control the capstan driving system.

According to the above method, however, the tape speed in the reproducing step cannot be accurately detected, even though the tape speed in the reproducing step can be brought into coincidence with the tape speed in the recording step.

In other words, when there exists wow and flutter in the tape run in the recording step, the timing signals cannot be recorded with equal spacings in the tape so that the reproduced timing signals do not accurately represent the tape speed at the reproduction step.

In case of a two rotating head type helical scan video tape recorder or the like, video signals for one field are recorded as an oblique track by a rotating head, regardless of the amount of wow in the tape supply. Thus, if there exists such wow in the recording step, there appear a variation in the relative speed with respect to the rotating head at a constant speed and the video signal is recorded on the tape at a varied position in accordance with the variations in the relative speed. In the case of a capstan servo type tracking control system, reproduction is carried out by detecting the rotation position signal from the shaft of the rotating head at a constant speed, reproducing the control signal recorded in the recording step at the peripheral portion of the tape, comparing the phases of the two and controlling the speed of the tape supply so that the rotating head accurately reproduces the information recorded as traces. When the control signal is recorded with variations from the regular positions due to wow resulting from the tape driving system in the recording step, the tape speed is controlled to reproduce the same situation as that in the recording step. There arises no problem if such a control is perfectly performed, but, in the case of controlling the speed of a rotating body having a certain inertia such as a capstan, there appears a time lag in the servo system. In other words, there are usually present such frequency response characteristics that the servo system cannot accurately follow the frequency variations (due to tape wow) above a certain frequency (usually several Hz). In such cases, the reproduced signal derived from a rotating head is inevitably accompanied by time base errors in accordance with the response delay of the capstan servo system. In order to compensate for such variations, in high-fidelity VTR's, the structure for driving a tape is made with higher precision to minimize the tape wow and a complicated and expensive electric circuit is needed for compensating for the jittering components which cannot be compensated through a servo system. Although video tape recorders have been exemplified as examples hereinbefore, in conventional high-fidelity tape recorders also, tape speed wows are minimized by raising the accuracy of the mechanical structure to realize the same conditions in the reproducing step as that of the recording step.

This invention is intended to solve the above problems.

An object of the invention is to provide an accurate speed detection by providing a signal of such a frequency that truly represents the speed of a tape or the rotation speed of a rotating body regardless of the wow and flutter in the recording step.

Another object of the invention is to provide a speed control utilizing said speed detection in a servo system for controlling a tape or a rotating body at a predetermined speed.

A further object of the invention is to provide a tape speed control adapted for a rotating head type magnetic video reproducer.

Yet another object of the invention is to provide speed control adapted for a rotating disk type magnetic video reproducing apparatus using a rotating magnetic disk.

According to an embodiment of the invention, there is provided a method for detecting the speed of a body of magnetic recording medium comprising the steps of bringing a first and a second magnetic head into contact with a body of a magnetic recording medium at a predetermined distance between the first and the second heads, said body being driven by driving means and said first head being disposed before said second head with respect to the transfer of said body of recording medium, recording pulse signals of the output of an oscillator through said first magnetic head, reproducing said recorded signals by said second magnetic head disposed after said first magnetic head, successively recording pulse signals in said recording medium by synchronously oscillating said oscillator with said reproduced signals, and detecting the transfer speed of said magnetic recording medium from the reproduced signal of said pulse signals.

Description will now be made of preferred embodiments with reference to the accompanying drawings in which.

Similar reference numerals represent similar parts throughout the drawings.

Figure 1:
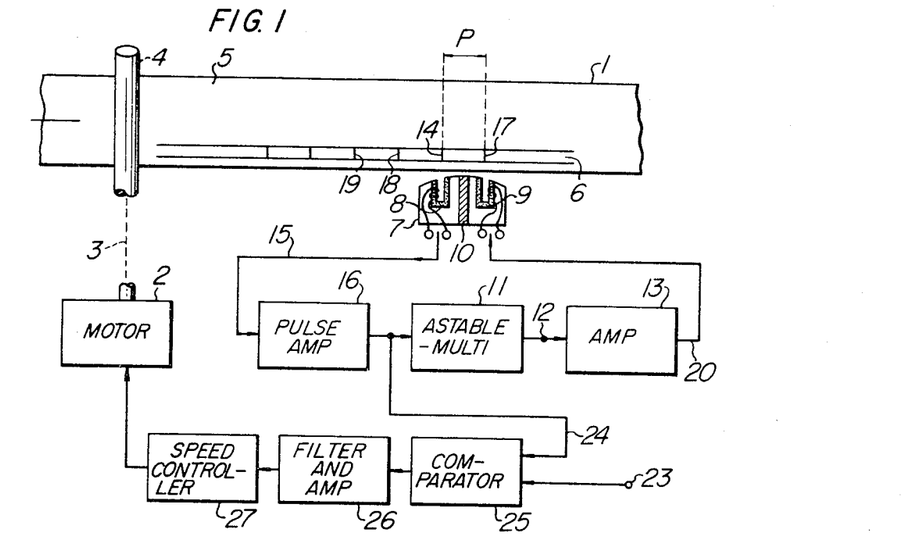
FIG. 1 is a block diagram of the electric circuitry of an embodiment of the invention.

In FIG. 1, a magnetic tape 1 is driven by a capstan shaft 4 interlocked through coupling means 3 (not shown) or directly connected with a capstan motor 2, with, for example, a pinch roller pressed to and cooperating with the shaft 4. In the tape 1, there is provided a region 5 for recording information and a track 6 for additionally recording control signals. Against the control track 6, a magnetic head assembly 7 in which two heads 8 and 9 are molded with a predetermined gap pitch is positioned. The two heads 8 and 9 are separated with a spacer 10 for magnetic shielding. The magnetic head assembly 7 is arranged to record signals of equal spacing in the tape. That is, the output 12 of an astable-multivibrator 11 is recorded in the tape by the head 9 through a record amplifier 13. The multivibrator 11 has the property of being synchronized with and switched on by a pulse signal of a frequency higher than of its self-oscillation frequency. As the tape 1 proceeds on its way, the trace 14 of a pulse signal recorded by the head 9 passes by the head 8 and at this moment the signal is reproduced (as indicated at 15) and amplified by a pulse amplifier 16. The output of the amplifier 16 triggers the astable-multivibrator 11 to reverse the polarity. Then, the amplifier 13 amplifies the output of the multivibrator and re-performs the recording of a pulse signal through the head 9 to form a trace 17. Repeating these procedures, changes of magnetic pattern corresponding to the polarity reversal of the astable-multivibrator 11 are recorded in the control track 6 of the tape 1 as is shown at 19, 18, 14, 17, . . . . It is to be noted that with a suitable selection of the tape supply speed, the gap pitch of the two heads and the self-oscillation frequency of the astable-multivibrator 11, pulse signals are recorded in the tape with a constant spacing determined by said pitch P regardless of variations in the tape speed. That is, a reference signal can be recorded.

The reason for employing an astable-multivibrator (not, for example, a flip-flop or a monostable-multivibrator) is to enable successive recordings of pulse signals even when the reproducing head 8 cannot reproduce the recorded signal by re-driving after being stopped or a drop-out of the tape, etc.

Assuming that the effective gap pitch P of the heads in P cm and that the predetermined tape speed is V cm/sec, the self-oscillation frequency of the astable-multivibrator 11 should be set a little lower than $$V/2P \text{ Hz} \ldots \qquad 1.$$

This allows for the oscilation to be synchronized with the reproduced signal, even when the oscillation frequency is subjected to a change due to fluctuations in tape speed, power source voltage, etc. In general, equation (1) may be represented as $$V/2P \times n \text{ Hz} \ldots \qquad 2$$

where $n$ is a positive integer or the inverse of a positive integer. In the cases of $n \neq 1$, the reproduced signal for triggering the establish-multivibrator 11 may not be the signal just previously recorded. For example, in the case of $n = 2$, in the reproduced signal (a leading and a trailing signal) only a leading signal is used for triggering the multivibrator.

Figure 2:
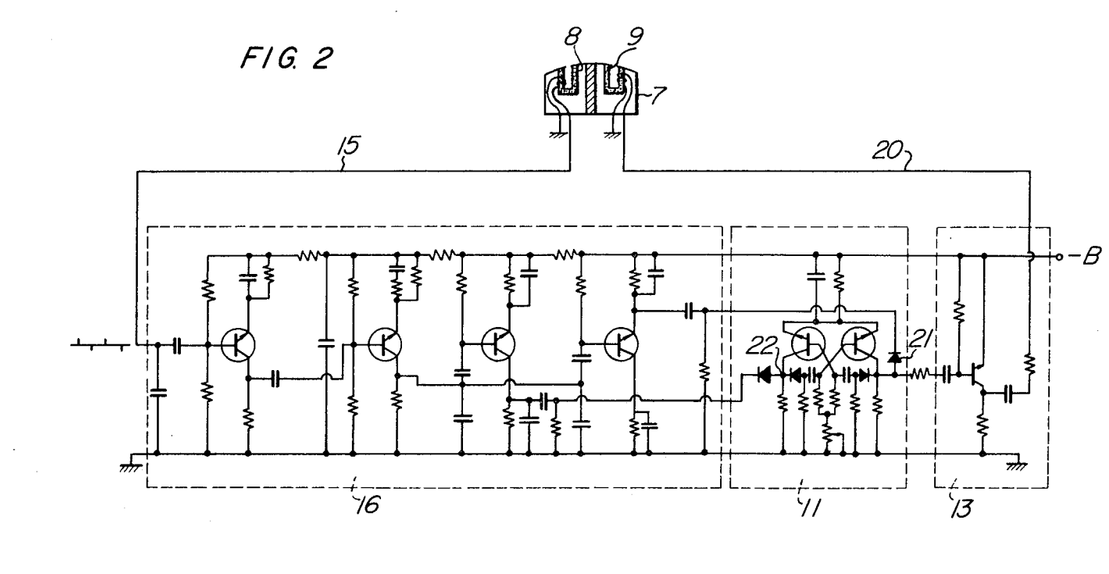
FIG. 2 shows the electric network of the main portion of the embodiment of FIG. 1.

FIG. 2 shows a detailed circuit network of an equally spaced signal recording and reproducing circuit system used in the embodiment of FIG. 1. The operation of the circuit of FIG. 2 will be apparent from the figure for those skilled in the art.

Provided that $V = 30$ cm/sec and $n = 1$, when the frequency of the reproduced signal is desired to be set at 30 Hz, the effective gap pitch $P$ between the two heads becomes;

$$P = \frac{30}{2.0 \times 30} \times 1 = 0.5 \text{ cm.}$$

Figure 3:
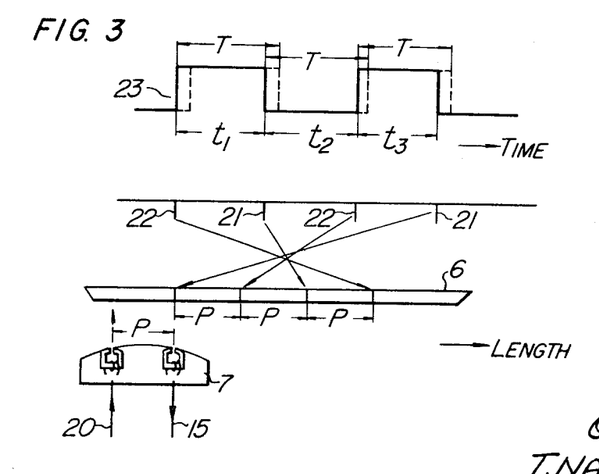
FIG. 3 illustrates the operation of the embodiment of FIG. 1.

Thus, the astable-multivibrator 11 is set to have a self-oscillation frequency a little lower than 30 Hz (at 28 Hz, for example). The signal 20 of a square wave current of 30 Hz is supplied to the recording head 9 to perform saturation recording in a magnetic tape. Positive and negative pulses are derived from the reproducing head 8 and are amplified and their polarity is reversed in the amplifier circuit. Then, the negative pulses 21 and 22 respectively triggers the two collectors of transistors in the astable-multivibrator 11 to successively record the signal of 30 Hz in the control track with equal spacing. FIG. 3 shows the waveforms of the astable-multivibrator of FIG. 2, in which letters $t_1$, $t_2$ and $t_3$ represent the time length of the recorded waveform and T indicates a half cycle of self-oscillation. The head assembly 7 should have such a structure so as to enhance the contact with a magnetic tape by means of a pad, etc.

Control of capstan speed by equally spaced recorded signals will be described hereinafter. In FIG. 1, an external reference signal 23 of a frequency (for example 30 Hz) and the output signal 15 of the reproducing head having a frequency of 30 Hz or the output square wave signal 12 of the astable-multivibrator 11 (in this case, the connection is not shown) working as signal 24 to be compared with the reference signal are supplied to a phase comparator 25 for comparison of their phases. The phase difference between these signals 23 and 24 is filtered, amplified and rectified at a low pass filter-amplifier circuit 26 to apply a DC signal to a speed control circuit 27 for a DC motor 2 for controlling the speed of the motor 2. Thus, the tape 1 is driven at a speed corresponding to the frequency of the external signal 23. Here, since the signal 24 represents the tape speed, wow and flutter resulting from the tape driving system have been compensated for.

For the method of employing a capstan servo, it is apparent that an AC synchronous motor may be driven with the amplified output of a variable frequency oscillator to control the variable oscillation frequency by the phase difference component, or that an eddy current brake may be provided to an AC induction motor so as to control the braking current by said phase difference component.

Now, embodiments of a magnetic video recording and reproducing system utilizing such a control system will be described referring to FIG. 4.

A rotating head disk 28 is provided with magnetic heads 29 and 30 disposed with a spacing angle of 180° to each other. With a 180° rotation of the disk 28, video signals of one field are recorded on and reproduced from a continuous oblique track 31. For example, a DC motor 2' is controlled to rotate at a speed of 1,800 rpm through a speed control circuit 27' by a 30 Hz signal 23' divided from the vertical synchronizing signal of 60 Hz of the video signal and a rotation speed detection signal is derived from the assembly of permanent magnets 29 and 30 disposed on the disk 28 and a stationary detection head. If the detection signal is supplied one for each rotation of the disk, it will have a frequency of about 30 Hz. As the synchronizing signal 23' and the detection signal are supplied to a phase comparator 25' to compare their phase and to apply the signal of their phase difference to the speed control circuit 27' through a low pass filter-amplifier circuit 26', the DC motor 2' is arranged to be phase-synchronously driven by the synchronizing signal 23'. In recording process, switches $S_1$, $S_2$, $S_3$ and $S_4$ are set to R position and the synchronizing signal 23' (30 Hz) is recorded in a control track 35 of a tape through a control head 34 to prepare a control signal 36 for use in tracking control in the reproduction process. Further, the capstan system is driven with high precision by similar methods as stated before to minimize wow and flutter. A head assembly 7 detects the tape speed. In the recording process, it can be cojointly used, for example, with the control track 35. That is, if the head assembly 7 is positioned before the control head 34 with respect to the order of the tape transfer, equally spaced signal traces after the detection of the tape speed are erased by the control head 34 which performs saturation recording, thereby causing no problem. Here, if the track width for the head assembly 7 is made narrower than that of the control head 34, an advantage is provided in that there occurs no risk of missing the erasing action.

In the reproduction process, switches $S_1$, $S_2$, $S_3$ and $S_4$ are connected to P terminals, and a phase comparator 25 in the capstan servo system is supplied with the reproduced control signal which is recorded in the recording process and the rotation signal of the rotating head to achieve a tracking servo system. Here, it is apparent that a separate control track may not be used if the head assembly 7 for detecting the tape speed is positioned before the erase head (not shown) with respect to the order of tape transfer.

Figure 4:
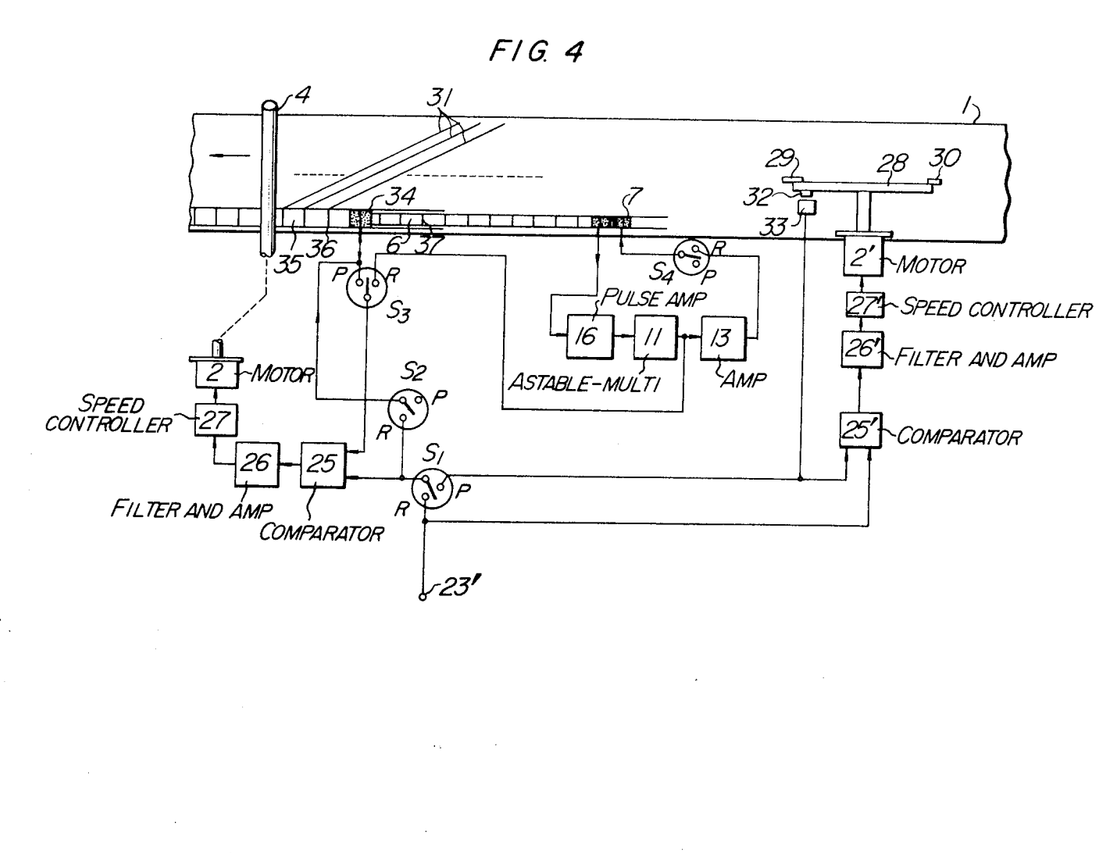
FIG. 4 is a block diagram of the electric circuitry of an embodiment of a rotating head type magnetic video reproducer apparatus according to the invention.
Figure 5:
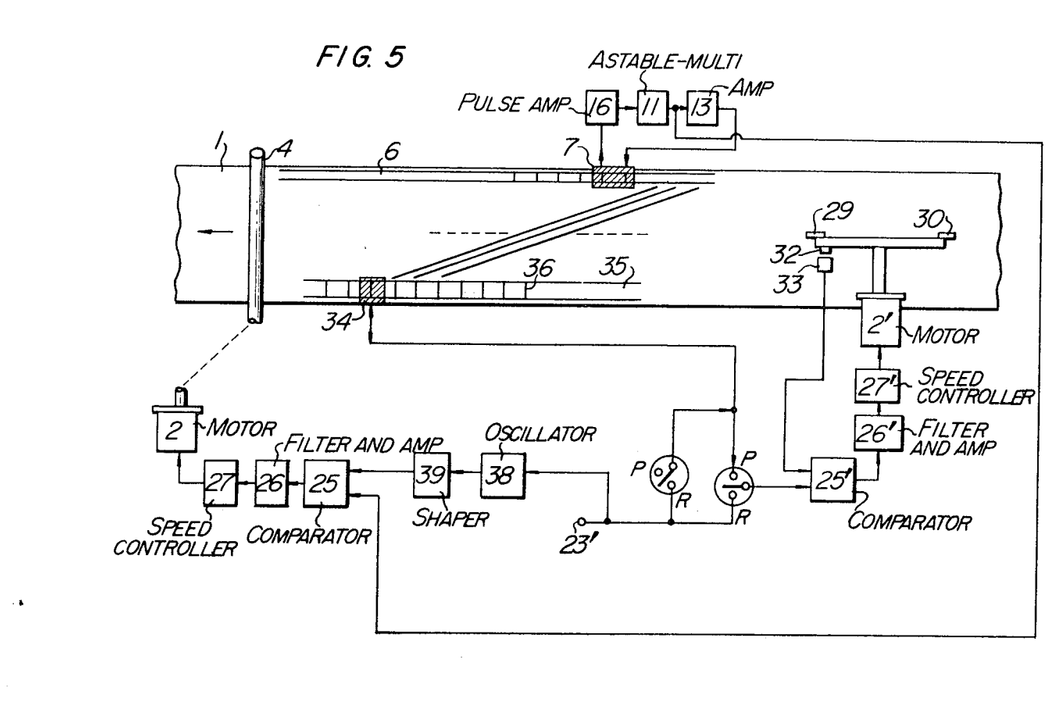
FIGS. 5 and 6 are block diagrams of the electric circuitries of another embodiment of the invention.

Another embodiment is shown in FIG. 5. In the above embodiment of FIG. 4, the tape speed is detected only in the recording process to minimize wow and flutter and not in the reproducing process connected with the tracking servo. In this embodiment, however, a control track 6 for detecting the tape speed is separately provided for both the recording and reproducing processes to keep the tape speed constant. In this case, one comparison signal for a rotating head control loop is always used for the tape speed detection signal and the other comparison signal is the output of a signal oscillator (30 Hz) 38 shaped by a pulse shaper 39. Further, the oscillation frequency of the signal generator 38 is made more stable if the generator 38 is composed of a buffer oscillator which is triggered by synchronous signal pulses 23' to oscillate synchronously.

Figure 6:
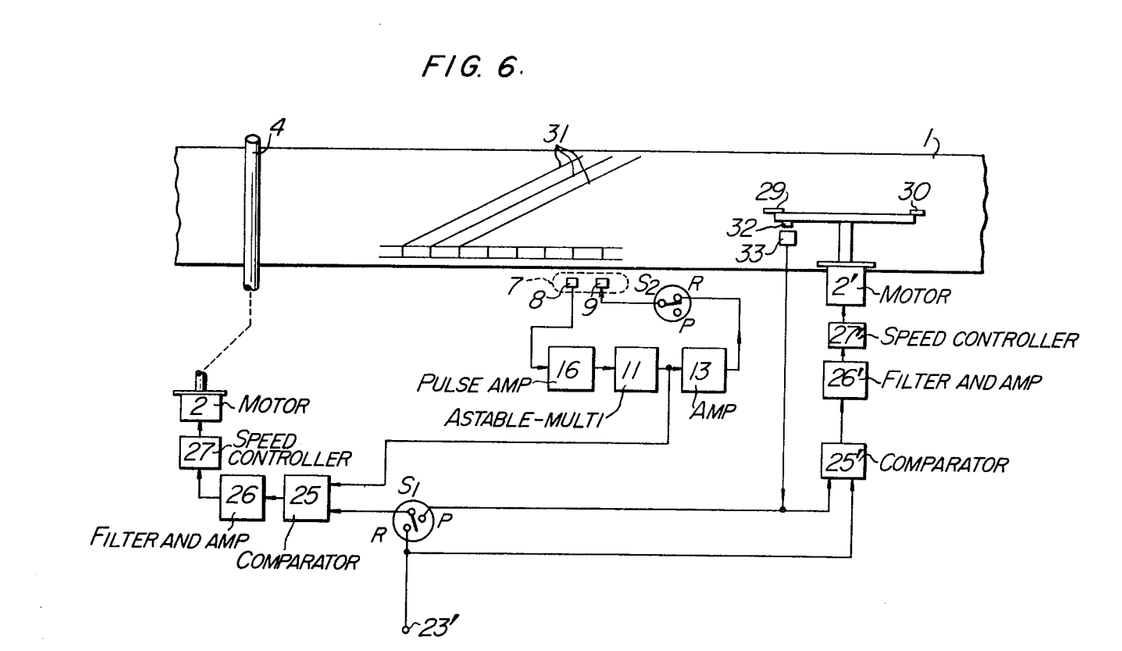

Further, a practical magnetic video recording and reproducing system is shown in FIG. 6 in which, in comparison with the embodiment of FIG. 4, no separate control head (34 in the case of FIG. 4) is provided and the equally spaced signal traces 37 recorded for the capstan servo in the recording process are reproduced by the reproducing head 8 in a reproduction process to form the control signal so as to perform the capstan servo operation in synchronism with the external reference signal 23'. Since the recording operation and the driving of a rotating head 28 are synchronously done in a particular phase relation with the reference signal 23', tracking of oblique record traces also becomes possible.

The structure of a head for detecting the tape speed has been described to be a head assembly including two heads, but any other structure may be adopted provided that the gap pitch between two heads can be set at a predetermined length.

Now, the invention will be further described in the case of a speed control for a rotating body, or more concretely in the case of a rotating disk type magnetic video recording and reproducing system.

In conventional rotating disk type magnetic video recording and reproducing systems, a magnetic sheet is rotated at a speed of 3,600 rpm in synchronism with the vertical synchronizing signal (60 Hz) of television signals of the standard television signal code (60 fields, 525 lines) to record the information of one field in one rotation.

Figure 8:
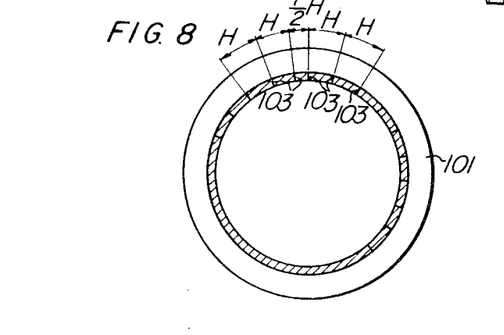
FIG. 8 illustrates the operation of a conventional rotating disk type magnetic video reproducer.

Thus, horizontal synchronizing signals corresponding to $$525 \times \tfrac{1}{2} = 262.5$$

lines are recorded in one round. Therefore, on a magnetic sheet 101, as is shown in FIG. 8, horizontal synchronizing signals 103 are not recorded with perfectly equal spacing of H, but a space of ½H inevitably appears. In a reproducing process, a disturbance appears in the horizontal synchronizing signal at the position of said spacing of ½H which is undesirable for providing a good reproduction of a stationary image in a television receiver.

This invention solves the above problem by rotating the magnetic sheet faster or slower by an odd multiple of ½H in every period of rotation than by one-sixtieth seconds in synchronism with the vertical synchronizing signal so as to record the horizontal synchronizing signals equally spaced over the whole rotation.

Namely, one rotation of a magnetic sheet disk is brought into correspondence with 262, 263, etc times the horizontal synchronizing signal period. For example, in the case of rotating a sheet disk in correspondence with 262 times the horizontal synchronizing signal period, there is provided a detection signal of a rotation rate of 60 Hz in response to a rotation of $$\frac{60}{262 \times 63.5 \times 10^{-6}} \text{ r.p.m.}$$

for the magnetic sheet disk, where the value of $63.5 \times 10^{-6}$ represents a period of 1 H (seconds). And such a detection signal and a reference signal of 60 Hz are compared in their phases. Then the rotation of the magnetic sheet is controlled according to the phase difference so as to synchronize with the reference signal.

Figure 7:
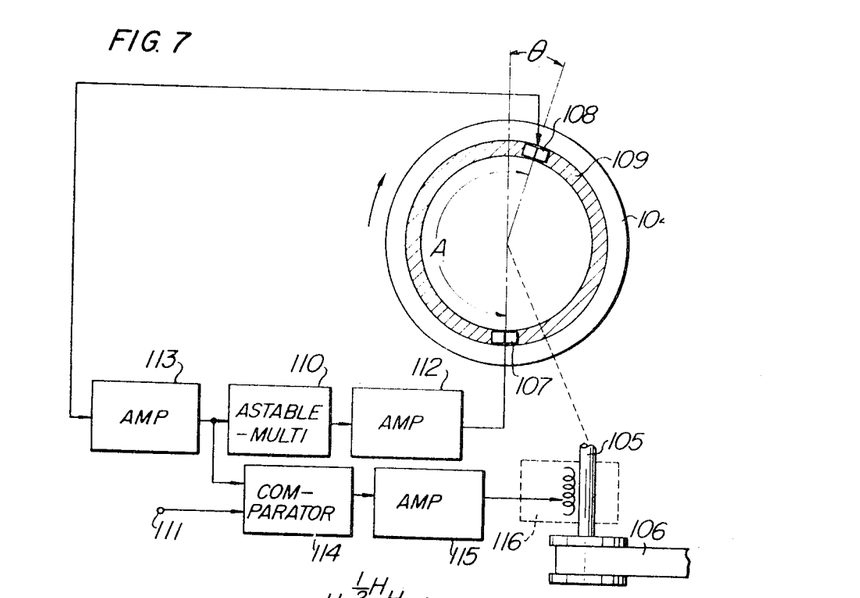
FIG. 7 is a block diagram of an embodiment of a rotating disk type magnetic video recorder according to the invention.

In FIG. 7, a rotating disk 104 provided on a rotating shaft 105 is subjected to rotation control. A magnetic recording medium layer is provided on the side or top surface of the disk 104. The rotating shaft is arranged to be rotated a little faster than a predetermined rotation speed by a driving source through an elastic belt 106 when not under control. A magnetic head 107 for recording pulse signals is brought into contact with the recording medium layer of said rotating disk 104. A magnetic head 108 is provided to reproduce record traces formed by said recording head 107. An astable-multivibrator 110 has a self-oscillation frequency a little lower than the frequency of an external reference signal (for example, vertical synchronizing signal of 60 Hz) applied to a terminal 111. The output of the astable-multivibrator 110 is applied through a record amplifier 112 to said recording magnetic head 107 and saturation-recorded in the recording medium. The output of the reproducing magnetic head 108 triggers the astable-multivibrator 110 through a reproduction amplifier 113 and is also fed to a phase comparator 114 to be compared with the external reference signal thereat. The output of the phase comparator 114 representing the phase difference is led through an amplifier 115 to an eddy current brake 116 provided on the rotating shaft 105 to control the rotation of the shaft 105. Provided that the disk 104 rotates in the direction shown by the arrow in this structure, if the reproducing magnetic head 108 is positioned with an angle shift of $$\theta = 360/262.5 \times \tfrac{1}{4}$$

toward the direction of rotation from the position of 180° from the recording magnetic head with respect to the rotation center of the disk, a rotating speed of $$\frac{60}{262 \times 63.5 \times 10^{-6}} \text{ r.p.m.}$$

for the disk 101 will produce a signal of 60 Hz from the reproducing magnetic head.

As is described above, if the rotation detection signal (the output of the reproduction amplifier 113 or the output of the astable-multivibrator 110 triggered by the output of the amplifier 113) and an external reference signal (the vertical synchronizing signal of 60 Hz applied to the terminal 111) are compared in their phases to control the eddy current brake 116 by this phase difference, the disk 104 can be synchronously rotated at a speed of $$\frac{60}{262 \times 63.5 \times 10^{-6}} \text{ r.p.m.}$$

in particular relation to the vertical synchronizing signal.

In general, taking the frequency of the horizontal synchronizing signal as $f_H$ Hz and the frequency of the vertical synchronizing signal as $f_V$ Hz, the rotation period of the disk can be arranged to be multiple times the period of the horizontal synchronizing signal if the rotation $r$ (rpm) of the disk is set as $$r = \frac{120 f_H}{\dfrac{2 f_H}{f_V} + n} \text{ r.p.m.}$$

where $n$ is a positive or negative odd integer, from the equation of $$\frac{1}{2}\left(\frac{2 f_H}{f_V} + n\right) \times \frac{r}{60} = f_H$$

Provided that the gap arrangement of the two heads 107 and 108 has an angle A with respect to the rotation axis toward the rotating direction, detection of a rotation signal of $\alpha f_V$, where $\alpha$ is a positive integer or the inverse of a positive integer, can be done by selecting A as follows:

$$\frac{360}{2A} \times \frac{r}{60} = \alpha f_V$$

$$\therefore A = \frac{3}{\alpha f_V} \times \frac{120 \times f_H}{\dfrac{2 f_H}{f_V} + n}$$

Further for controlling a rotating body to a rotation speed of $r$ with an external reference signal of a frequency $f$ Hz, the gap pitch $A'$ (degree) (with respect to the rotation center) of two magnetic heads on a magnetic disk for speed detection mounted on a rotating body is set to be $$A' = 3/2 f \cdot r$$

As is described above, for a constant reference signal and an arbitrary desired speed, a servo system which is kept in phase synchronism with said reference signal can be formed by adjusting the relative position of the two heads and deriving such a speed detection signal that there is a particular relationship to the external reference signal.

What is claimed is:

1. A method for controlling the transfer speed of a body of a magnetic recording medium driven by driving means comprising the steps of bringing a first and a second magnetic head into contact with a body of a magnetic recording medium at a predetermined distance between the first and the second heads, said body being driven by driving means and said first head being disposed before said second head with respect to the transfer of said body of recording medium, recording pulse signals of the output of an oscillator through said first magnetic head, reproducing said recorded signals by said second magnetic head disposed after said first magnetic head, successively recording pulse signals in said recording medium by synchronously oscillating said oscillator with said reproduced signals, comparing the phases of a signal related with said reproduced signals and an external reference signal to derive the phase difference signal and controlling said driving means with said phase difference signal.

2. A method according to claim 1, in which said body of magnetic recording medium is a magnetic tape and said external reference signal is the horizontal synchronizing signal of the video signal to be recorded on said tape.

3. A method according to claim 1, in which said body of magnetic recording medium is a rotating magnetic disk.

4. A method for controlling the speed of a magnetic disk of a magnetic disk type magnetic video reproducer apparatus in recording video signals for one field of television signal according to an interlaced scanning system having a vertical synchronizing signal of frequency $f_v$ Hz and a horizontal synchronizing signal of frequency $f_H$ Hz and a horizontal synchronizing signal of frequency $f_H$ Hz in a magnetic disk rotated by driving means with a stationary head, comprising the steps of recording the oscillation output of an oscillator with a first magnetic head in a rotating body of magnetic medium rotated in relation with said magnetic disk, reproducing the recorded signal of said output with a second magnetic head at a position spaced from said first magnetic head by $$\frac{3}{2f_v} \times \frac{120 \times f_H}{\frac{2f_H}{f_v} + n}$$

degree with respect to the rotation center of said rotating body of magnetic medium toward the rotating direction, synchronously driving said oscillator with said reproduced signal, comparing the phases of said reproduced signal and the vertical synchronizing signal reproduced by said second head to derive the signal of phase difference and controlling said driving means by said phase signal difference.

5. A method of controlling tape speed in a magnetic video recording and reproduction apparatus, comprising the steps of:
   a. controlling a tape driving means during the recording of a television signal, including the steps of:
      driving a magnetic tape past first and second magnetic head means spaced apart a predetermined distance from each other,
      recording output signals from a self-oscillator onto a recording track of said magnetic tape through said first magnetic head means,
      reproducing said recorded output signals from said magnetic tape by said second magnetic head means,
      triggering said self-oscillator with said signals reproduced by said second magnetic head means,
      comparing the phase of a signal relating to the vertical synchronizing signal component of said television signal with the phase of the output signal of said self-oscillator by a first phase comparator, and
      controlling said tape driving means by a signal corresponding to the phase difference obtained from said first phase comparator;
   b. controlling a rotating head driving means during said recording, including the steps of:
      recording a saturating control signal related to said vertical synchronizing signal onto said recording track after said recorded output signals have been reproduced by said second magnetic head means,
      comparing the phase of a signal corresponding to the rotation rate of a rotating head with the phase of a signal relating to said vertical synchronizing signal by a second phase comparator, and
      controlling said rotating head driving means by a signal corresponding to the phase difference obtained from said second comparator; and
   c. controlling said tape driving means during the reproduction of the television signal recorded on said magnetic tape, including the steps of:
      comparing the phase of said control signal with the phase of the signal corresponding to the rotation rate of said rotating head by said first phase comparator, and
      controlling said tape driving means by a signal corresponding to the phase difference obtained from said first comparator.

6. A method of controlling tape speed in a magnetic video recording and reproducing apparatus, comprising the steps of:
   a. controlling a tape driving means during the recording of a television signal, including the steps of:
      driving a magnetic tape past first and second magnetic head means spaced apart a predetermined distance from each other,
      recording output signals from a self-oscillator onto a recording track of said magnetic tape through said first magnetic head means,
      reproducing said recorded output signals from said magnetic tape by said second magnetic head means,
      triggering said self-oscillator with said signals reproduced by said second magnetic head means,
      comparing the phase of a signal relating to the vertical synchronizing signal component of said television signal with the phase of the output signal of said self-oscillator by a first phase comparator, and
      controlling said tape driving means by a signal corresponding to the phase difference obtained from said first phase comparator;
   b. controlling a rotating head driving means during the recording of said television signal, including the steps of:
      comparing the phase of a signal corresponding to the rotation rate of said rotating head driving means with the phase of said signal relating to the vertical synchronizing signal by a second phase comparator,
      controlling said rotating head driving means by a signal corresponding to the phase difference obtained through said second phase comparator; and
   c. controlling said tape driving means during the reproduction of the television signal recorded on said magnetic tape, including the steps of:
      comparing a signal corresponding to the output signal of said self-oscillator and a signal corresponding to the rotating rate of said rotating head, said output of said self-oscillator being related to the reproduced output of said second magnetic head means, and
      controlling said tape driving means by a further signal corresponding to the phase differences obtained from said first phase comparator.

7. A method of controlling tape speed in a magnetic video recording and reproducing system, comprising the steps of:
   driving a magnetic recording medium past first and second magnetic head means spaced apart from each other a predetermined distance;
   generating an output signal from an oscillator having the characteristics of an astable multi-vibrator;
   applying said oscillator output signal to said magnetic recording medium through said first magnetic head means;
   reproducing said recorded output signal by said second magnetic head means;
   applying said reproduced output signal to the input of said oscillator, thereby controlling the frequency of oscillation of said oscillator;
   applying a signal corresponding to said reproduced output signal to a phase comparator;
   applying, in a record mode, a signal corresponding to the vertical synchronizing signal component of a television signal being recorded on said magnetic recording medium to said phase comparator;
   applying the thus obtained first phase difference signal output of said phase comparator to magnetic recording medium driving means; and controlling the speed at which said magnetic recording medium is driven past said first and second magnetic head means by said first phase difference signal.

8. The method according to claim 7, comprising the further steps of:

detecting the phase of rotation of rotating magnetic head driving means;

applying the signal corresponding to said detected phase of rotation and said vertical synchronizing signal component to a further phase comparator;

applying the phase differences signal output of said further comparator to said rotating magnetic head driving means to control the speed of rotation thereof;

applying, in the reproduce mode of operation of said system, said detected phase of rotation signal and said signal corresponding to the reproduced output of said oscillator to said phase comparator;

applying the thus obtained second phase difference signal output of said phase comparator to said magnetic recording medium driving means; and controlling the speed at which said magnetic recording medium is driven past said first and second magnetic head means by said second phase difference signal.

* * * * *